E. A. EWING.
CLUTCH.
APPLICATION FILED SEPT. 21, 1912.

1,120,044.

Patented Dec. 8, 1914.
3 SHEETS—SHEET 1.

Witnesses:
Wm. Geiger
Pearl Abrams

Inventor:
Edgar A. Ewing,
By Munday, Evarts, Adcock & Clarke,
his Attys

E. A. EWING.
CLUTCH.
APPLICATION FILED SEPT. 21, 1912.
1,120,044.
Patented Dec. 8, 1914.
3 SHEETS—SHEET 2.
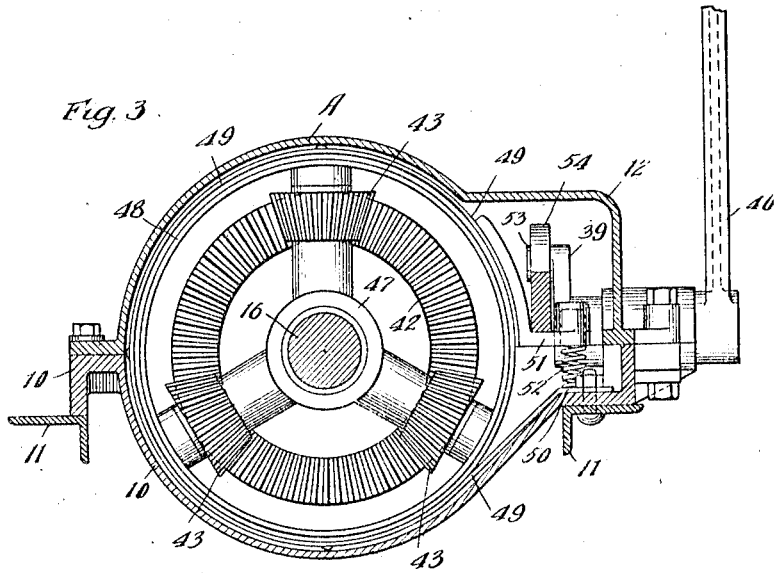
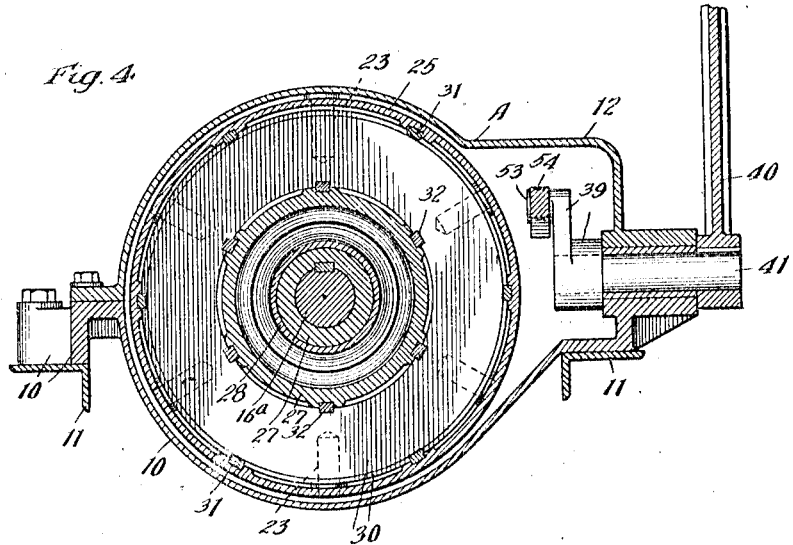
Witnesses:
Wm. Geiger
[signature]
Inventor:
Edgar A. Ewing
By Munday, Evarts, Adcock & Clarke,
his Attys

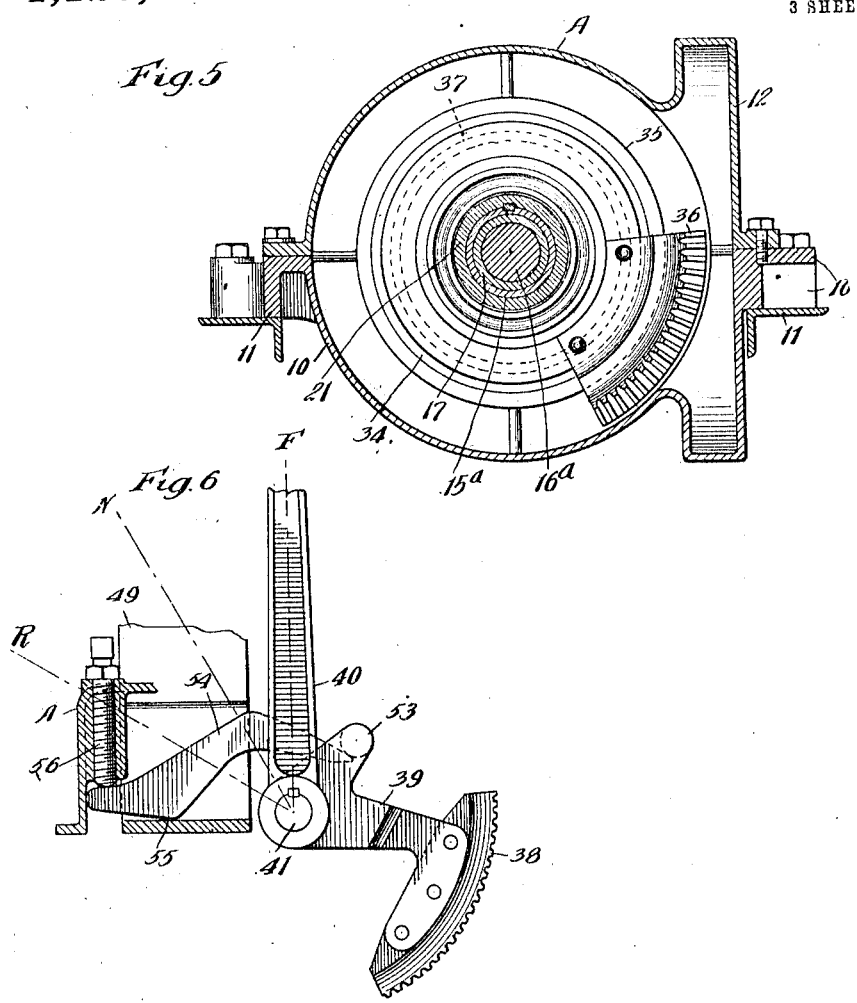

UNITED STATES PATENT OFFICE.

EDGAR A. EWING, OF CHICAGO, ILLINOIS, ASSIGNOR TO HARBECK MOTORS COMPANY, OF CHICAGO, ILLINOIS, A CORPORATION OF ILLINOIS.

CLUTCH.

1,120,044.  Specification of Letters Patent.  Patented Dec. 8, 1914.

Application filed September 21, 1912. Serial No. 721,528.

*To all whom it may concern:*

Be it known that I, EDGAR A. EWING, a citizen of the United States, residing in Chicago, in the county of Cook and State of Illinois, have invented a new and useful Improvement in Clutches, of which the following is a specification.

This invention relates to improvements in clutches, and more particularly to that type of clutch known as the marine clutch.

An object of the invention is to provide a marine friction clutch, easily operated, and in which the axial thrust or pressure from the driven propeller shaft will be utilized automatically to complete the necessary pressure or clamping action between the friction members of the clutch and retain these members in operative driving engagement, after a slight, initial pressure has been placed upon the friction members by a manually operated clutch lever.

Other objects of the invention are to provide a clutch of the type above indicated, in which the coöperating friction members will be automatically pressed tighter together, the greater the power transmitted to the propeller shaft from the engine, the pressure exerted between the friction members of the clutch being proportional to the thrust or pressure from the propeller; to provide a clutch in which the coöperating friction members are movable axially relatively to each other with means which will move the members axially equally and evenly at all points around the axis of rotation, said means including a screw member and to provide a clutch in which all the parts are so arranged that any or all wear is substantially, automatically compensated for.

The invention furthermore consists in the improvements in the parts and devices and in the novel combinations of parts and devices herein shown, described or claimed.

Figure 1:
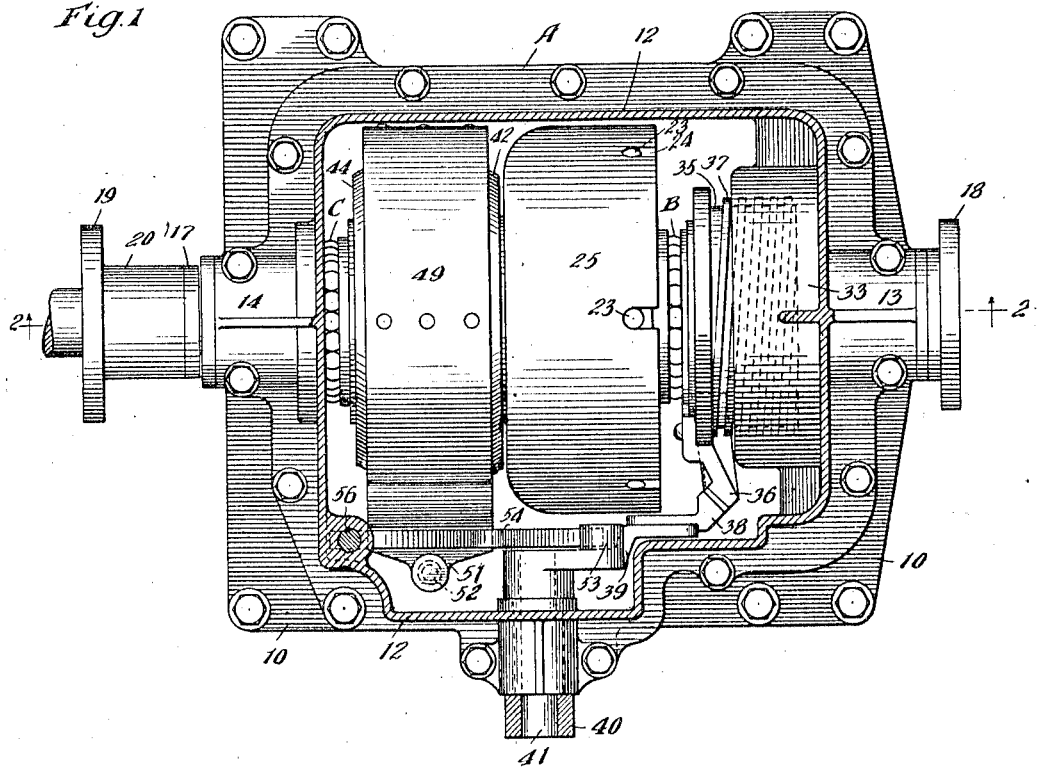
Figure 2:
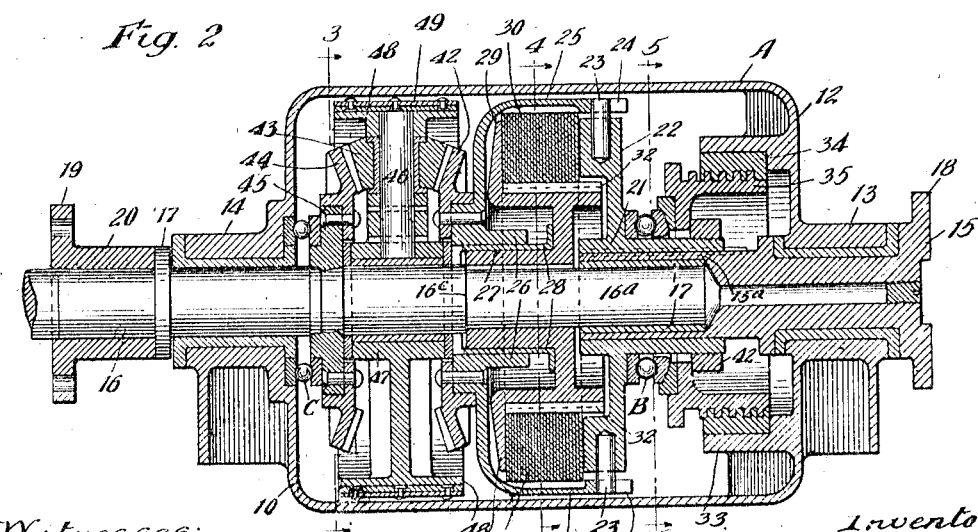

In the drawings forming a part of this specification, Figure 1 is a horizontal, sectional view of a marine clutch embodying my improvements. Fig. 2 is a vertical, longitudinal, sectional view of the structure shown in Fig. 1, and taken on the line 2—2 of Fig. 1. Figs. 3, 4 and 5 are vertical, transverse, sectional views, taken respectively on the lines 3—3, 4—4 and 5—5 of Fig. 2, and Fig. 6 is a detail view, showing a part of the clutch lever and immediate parts, the clutch lever being shown in the forward position, and dotted lines illustrating the neutral and reverse positions of the lever.

In the drawing, A denotes the casing or housing in which the clutch and reversing mechanism are inclosed, and which may be of any suitable form, that shown in the drawings comprising a lower member 10 adapted to be suitably secured to and supported by angle irons 11 or other supporting members of a launch and removably secured to the lower casing member 10 is an upper casing member 12. The casing or housing is provided with suitable front and rear journal bearings 13 and 14, in which are supported, respectively, the driving or engine shaft 15 and the driven or propeller shaft 16, the latter having an extended inner end $16^a$ extending into a hollowed out inner end $15^a$ of the driving shaft, a bearing sleeve 17 being interposed between the parts $16^a$ and $15^a$. The driving shaft 15, as shown, is provided with a flange 18 by which the same may be coupled directly to another portion of the engine shaft. The propeller shaft 16 is similarly provided with a coupling flange 19, formed on a sleeve 20, rigidly secured to the shaft 16. The shaft 16 is also provided with a flange or collar 117, which is so located that the shaft may have a slight play longitudinally or axially in the bearing 14 for a purpose hereinafter specified.

For transmitting power from the one shaft to the other, the following means are provided: Slidably keyed on the shaft 15 at its inner end is a sleeve or hub 21 having a flange 22, the latter being provided around its periphery with a plurality of projections or dowel pins 23 adapted to slide back and forth in a plurality of coöperating slots 24 formed in the periphery of an outer shell or disk holding member 25, the latter being provided with a hub 26, rotatably mounted on a sleeve member 27 rigidly secured to the shaft 16 and against a shoulder $16^c$, a bearing sleeve 28 being preferably interposed between the hub 26 and sleeve 27. The sleeve 27 is provided with a right angled rim portion 29, adapted to support and retain a number of friction disks 30, the rim 29 coöperating with the shell 25 and flange 22 to properly retain the disks 30 in position. The disks 30 comprise a number of large or outer members and a corresponding number of small or inner members, the large and small disks being alternately arranged, the large disks being slidably mounted on keys 31 secured in the shell or disk holding member 25, and the small disks being similarly mounted on a plurality of keys 32, secured in the rim 29 of the member 27. From the preceding description, it will be seen that upon sufficient pressure being applied to the friction disks 30, power will be transmitted from the driving or engine shaft to the driven or propeller shaft, and for placing an initial slight pressure on these disks, the following mechanism is employed.

The housing or casing A is provided with an inwardly extending hub 33, in which is rigidly secured a nut 34. Rotatably mounted within the nut 34 and bodily, axially movable therein is a screw 35, the latter being provided on its periphery with a segmental gear 36 which, as more clearly shown in Fig. 1, forms a portion of a worm thread having its pitch parallel to that of the screw threads 37 on the worm 35. Adapted to engage with the segmental gear 36 and thereby rotate the screw 35 in either direction is a coöperating segmental gear 38, secured to an arm 39 of the clutch operating lever 40, the latter being pivotally mounted as at 41. Interposed between the screw 35 and the flange 22 is a thrust ball bearing B, which may be of any suitable or well known form, and for properly retaining the ball bearing and the members 22 and 35 in proper relation to each other, a clamp nut 42 is threaded onto the sleeve or hub 21. Hence it will be seen that as the screw 35 is rotated by moving the clutch lever, the flange 22 will be moved in a direction corresponding to the direction of movement of the screw.

For reversing, any well known form of reversing mechanism may be used although the same forms no part of my invention, the reversing mechanism shown in the drawing being illustrated and described merely for convenience in understanding the use of the same in connection with my improvements. The reversing mechanism which I have shown comprises a bevel gear 42 secured to the shell or outer disk-supporting member 25, three radially arranged, intermediate bevel gears 43 and a bevel gear 44 rigidly secured to a flange 45 shrunk on or otherwise secured to the shaft 16. Each of the intermediate bevel gears 43 is mounted on a radially extending shaft 46, secured to a hub 47, loosely, rotatably mounted on the shaft 16. The outer ends of the shafts 46 are secured in a friction rim 48, which is adapted to be prevented from rotation when reversing by means of a friction band 49, the latter being fixed at one end, as shown at 50, and extending around the friction rim 48, and having its other end 51 yieldingly controlled, as by means of a spring 52. Whenever it is desired to reverse the direction of rotation of the propeller or driven shaft, the clutch lever 40 is moved to the position shown by dotted line, referenced R, in Fig. 6, whereupon the cam 53 on the lever arm 39 will engage a loosely mounted, band-operating lever 54 which engages the friction band 49 at the point 55 and is loosely fulcrumed against an adjustable screw 56. Interposed between the flange 45 and the rear end of the casing or housing A is a thrust ball bearing C.

In operation, the clutch works as follows: The lever 40 is moved to the forward position by the operator, which will cause the screw 35 to be rotated, which in turn will force the flange 22 against the friction disks 30 with just enough force to make the disks lightly engage each other, whereupon the propeller shaft will begin to "pick up" or rotate, and as soon as rotation of the propeller shaft is commenced, a certain amount of pressure or thrust will be exerted along the propeller shaft in a direction toward the driving or engine shaft, and on account of the slight amount of play allowed for the propeller shaft, the same will move inwardly and thereby force the sleeve or hub carried thereby firmly against the friction disks 30, thus increasing the pressure on the friction disks, which pressure will be constantly and automatically maintained so long as the power is being transmitted to the propeller shaft. When it is desired to disengage the clutch, the clutch lever is moved back to its neutral position, which will rotate the screw 35 in a reverse direction, and the latter in turn will withdraw the sleeve or hub 21, carrying the flange 22, thereby loosening or disengaging the friction disks. The pitch of the threads 37 on the screw 35 is made such that the thrust exerted against it from the propeller shaft through the intermediary of the friction disks will not be able to force the screw 35 backward into its sleeve nut 34. When it is desired to reverse the rotation of the propeller shaft, the clutch lever is turned back to its reverse position, which will still further withdraw the flange 22 from engagement with the friction disks, and which at the same time will tighten the friction band 49, thus preventing the intermediate bevel gears 43 from revolving about the shaft and causing the shaft 16 to rotate in a reverse direction in a well known manner.

From the foregoing description, it will be seen that a very slight exertion is required by the operator to throw the clutch into active operation, and that the greater portion of the pressure necessary to keep the friction disks in operative, driving engagement is furnished automatically by the propeller shaft itself, and also that when it is desired to disengage the friction disks or render the clutch inoperative, very little exertion is necessary to return the worm gear to its normal or neutral position. Furthermore it will be noticed that any wear on the friction disks, which are the parts most subject to wear, can be readily taken up by merely rotating the screw 35 slightly more than is ordinarily done when the clutch is first put into use.

Although I have herein shown and described what I now consider to be the preferred form of the invention, yet it will be obvious to those skilled in the art that various changes and modifications may be made in the details of construction and arrangements of parts without departing from the spirit of the invention, and I do not limit myself to the precise structure shown and described, except in so far as defined by the claims appended hereto.

I claim:—

1. In a clutch of the character described the combination of a driven element, a driving element, one of said elements being movable axially relatively to the other, and means including a member independent of the axially movable element for placing said driven and driving elements in operative driving engagement, substantially as specified.

2. In a clutch of the character described the combination of a driven element, a driving element, one of said elements being movable axially relatively to the other, and means including a rotatable threaded member movable axially and independent of the axially movable element for placing said driving and driven members in operative driving engagement, substantially as specified.

3. In a clutch of the character described the combination of a driving element, an axially movable driven element normally movable, when driven, toward said driving element, and means for transmitting power from the driving to the driven element comprising friction clutch members connected respectively to the driving and driven elements so that the tendency of the driven element to move toward the driving element increases the tenacity of engagement between the clutch members, and means axially movable relatively to the driving element and dissociated from the driven element for operating said clutch members, substantially as specified.

4. In a clutch of the character described the combination of a driving element, an axially movable driven element normally movable when driven toward said driving element, and means for transmitting power from the driving to the driven element comprising friction clutch members connected respectively to the driving and driven elements so that the tendency of the driven element to move toward the driving element increases the tenacity of engagement between the clutch members, and rotatable threaded means axially movable relatively to the driving element and dissociated from the driven element for operating said clutch members, substantially as specified.

5. In a clutch of the character described the combination of a driving shaft, a driven shaft disposed in alinement, said driven shaft being axially movable toward said driving shaft when driven by the driving shaft, and means for connecting said shafts comprising a housing providing bearings for the adjacent ends of said shafts, clutch members secured to the ends of said shaft within said housing and a rotatable element embracing said driving shaft and threaded into said housing for moving the clutch member mounted on the driving shaft in and out of engagement with the clutch member mounted on the driven shaft and for holding the same in fixed position whereby the clutch members are first lightly engaged to start the driven shaft and are subsequently firmly held together with the thrust pressure of the driven shaft and may be disengaged by independent movement of the threaded member and clutch member on the driving shaft, substantially as specified.

6. In a clutch of the character described the combination of a driven element, a driving element, said driven element being relatively movable axially toward and from the driving element, clutch members connecting said elements and adapted to increase the tenacity of interengagement as the driven element moves toward the driving element, and means independent of the driven element for withdrawing said clutch members from interengagement, substantially as specified.

7. In a clutch of the character described, in combination: a driving shaft; a driven shaft; a sleeve provided with a flange slidably keyed to the driving shaft; a sleeve having a right angled rim 29 rigidly secured to the driven shaft; a plurality of friction disks interposed between said flange and said rim; a stationary sleeve nut; a screw rotatably mounted in said nut; a thrust ball bearing interposed between said screw and the flange; and means, manually operable, for rotating said screw, to thereby apply pressure to the friction disks, substantially as specified.

8. In a marine clutch, in combination: an engine shaft; a longitudinally movable propeller shaft; and means for transmitting power from the engine shaft to the propeller shaft, including a member secured to and movable with the propeller shaft, a member keyed to and slidable on the engine shaft, a plurality of friction disks interposed between said members, and manually operated mechanism for moving said members relatively toward each other to place the friction disks in a light, initial engagement, the thrust from the propeller shaft, as the latter rotates, serving to automatically increase the pressure on the disks and thereby firmly hold the same in operative, driving engagement, substantially as specified.

9. In a clutch of the character described, in combination: a driving shaft; a driven propeller shaft exerting pressure axially in a direction toward the driving shaft, said shafts being relatively slidably axially movable; coöperating relatively movable friction clutch elements interposed between the two shafts; a member carried by one of said shafts and axially movable therealong and adapted to exert pressure on said friction elements; and means manually operable for so sliding said member to place said friction elements in an initial relatively light, frictional engagement with each other, the pressure from the driven shaft being thereafter utilized to automatically increase and maintain the pressure between the friction members, substantially as specified.

10. In a marine clutch, in combination: a driving member; a driven propeller shaft axially movable relatively to the driving member; coöperating relatively movable friction clutch elements interposed between said driving member and the propeller shaft; a slidably mounted member movable axially relatively to the propeller shaft and adapted to exert pressure on said friction elements; and means, manually operable, for so sliding said last named member to thereby place the friction elements in an initial frictional engagement, the pressure from the propeller shaft being thereafter utilized to automatically increase and maintain the pressure between the friction elements, substantially as specified.

EDGAR A. EWING.

Witnesses:
 PEARL ABRAMS,
 WILLIAM A. GEIGER.